(12) United States Patent
Bago et al.

(10) Patent No.: US 11,231,274 B1
(45) Date of Patent: Jan. 25, 2022

(54) LEVELING DEVICE

(71) Applicant: Gulfstream Aerospace Corporation, Savannah, GA (US)

(72) Inventors: Timothy A. Bago, Savannah, GA (US); James Perdue, Savannah, GA (US); Patrick Leonard, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 6 days.

(21) Appl. No.: 16/936,141

(22) Filed: Jul. 22, 2020

(51) Int. Cl.
*G01C 9/28* (2006.01)
*B64F 1/22* (2006.01)

(52) U.S. Cl.
CPC . *G01C 9/28* (2013.01); *B64F 1/22* (2013.01)

(58) Field of Classification Search
CPC ........................................................ G01C 9/28
USPC ............................................................. 33/347
See application file for complete search history.

(56) References Cited

U.S. PATENT DOCUMENTS

| | | | | |
|---|---|---|---|---|
| 3,820,249 A * | 6/1974 | Stone | ....................... | G01C 9/26 33/347 |
| 4,124,940 A * | 11/1978 | Vaida | ....................... | G01C 9/28 33/379 |
| 4,829,676 A * | 5/1989 | Waldron | .................. | G01C 9/28 33/372 |
| 5,421,094 A * | 6/1995 | McCord | .................... | G01C 9/28 33/371 |
| 6,026,581 A * | 2/2000 | Gruetzmacher | ......... | G01C 9/28 33/370 |
| 6,029,359 A * | 2/2000 | Szumer | .................... | G01C 9/28 33/373 |
| 6,029,360 A * | 2/2000 | Koch | ....................... | G01C 9/28 33/381 |
| 6,568,095 B2 * | 5/2003 | Snyder | .................... | G01C 9/28 33/370 |
| 6,834,435 B2 * | 12/2004 | Turner | .................... | G01C 9/28 33/370 |
| 8,621,760 B2 * | 1/2014 | Norelli | .................... | G01C 9/28 33/371 |
| 9,885,571 B2 * | 2/2018 | Hoppe | .................... | G01C 9/34 |
| 2014/0173923 A1 * | 6/2014 | Van Bortel | ............. | A47G 1/22 33/379 |
| 2021/0262795 A1 * | 8/2021 | Calhoun | .................. | G01C 9/34 |

OTHER PUBLICATIONS

Milwaukee, Service Parts List for Pocket Level, May 2017.

* cited by examiner

*Primary Examiner* — George B Bennett
(74) *Attorney, Agent, or Firm* — LKGlobal | Lorenz & Kopf, LLP

(57) ABSTRACT

A leveling device is disclosed herein. The leveling device includes a body having a body having front surface, bottom surface, side surface and a rear mounting support, the side surface having an aperture configurated to receive a spirt level and a front surface having an aperture therein for viewing the sprit level in the body and the rear mounting support having a first mounting surface configured to be at an angle relative to a plane of the bottom surface, and a second mounting surface orthogonal to the first mounting surface, each of the first and second mounting surfaces having at least one aperture formed therein to receive a magnetic coupling element, whereby, the body containing the sprit level may be magnetically coupled to a vehicle to indicate whether the vehicle remains level during a jacking operation.

20 Claims, 8 Drawing Sheets

LEVELING DEVICE

TECHNICAL FIELD

The present invention generally relates to leveling devices that are used in connection with assuring an object is level relative to a surface, and more particularly relates to a leveling device that facilitates aircraft maintenance.

BACKGROUND

Contemporary business aircraft require regular maintenance in order to retain flight certification. During some aircraft maintenance operations (e.g., landing gear service), the aircraft must be elevated (commonly referred to as jacked) from the service facility floor in order to access, remove or otherwise service the aircraft. Typically, hydraulic jacks are installed in the floor of the service facility for elevating the aircraft. It is common on typical business aircraft to have three jacking points; one under each wing and a third just aft of the front landing gear. When elevating (or jacking) an aircraft, the aircraft wings should be kept substantially level from the service facility floor so that the aircraft does not slide off the wing jacks and potentially damage the aircraft. In a typical jacking operation, several service technicians are used to gauge the level of the aircraft wings manually (i.e., by eye), which can be prone to human error.

Accordingly, it is desirable to provide more objective manner to gauge the level of an aircraft during a jacking operation. It is further desirable that a reliable leveling device be easy to attach, use and remove from the aircraft at the conclusion of service. Furthermore, other desirable features and characteristics will become apparent from the subsequent detailed description and the appended claims, taken in conjunction with the accompanying drawings and the foregoing technical field and background.

BRIEF SUMMARY

Exemplary embodiments of a leveling device are disclosed herein. In a first non-limiting embodiment, the leveling device includes, but is not limited to, a body having a body having front surface, bottom surface, side surface and a rear mounting support, the side surface having an aperture configured to receive a spirt level and a front surface having an aperture therein for viewing the sprit level in the body and the rear mounting support having a first mounting surface configured to be at an angle relative to a plane of the bottom surface, and a second mounting surface orthogonal to the first mounting surface, each of the first and second mounting surfaces having at least one aperture formed therein to receive a magnetic coupling element, whereby, the body containing the sprit level may be magnetically coupled to a vehicle to indicate whether the vehicle remains level during a jacking operation.

In a second non-limiting embodiment, a leveling device includes, but is not limited to, a body having front surface, bottom surface, side surface and a rear mounting support, the side surface having an aperture configured to receive a spirt level and a front surface having an aperture therein for viewing the sprit level in the body, the rear mounting support having a first mounting surface configured to be at an angle of approximately thirty degrees relative to a plane of the bottom surface, and a second mounting surface orthogonal to the first mounting surface, each of the first and second mounting surfaces having at least one aperture formed therein to receive a neodymium magnetic coupling element, whereby, the body containing the sprit level may be magnetically coupled to a vehicle to indicate whether the vehicle remains level during a jacking operation.

In a third non-limiting embodiment, a method is provided for forming a body for a leveling device. The method includes, but is not limited to, successively depositing a thermoplastic material to produce the body having a front surface, bottom surface, side surface and a rear mounting support, the side surface having an aperture configured to receive a spirt level and a front surface having an aperture therein for viewing the sprit level in the body, and the rear mounting support having a first mounting surface configured to be at an angle of approximately thirty degrees relative to a plane of the bottom surface, and a second mounting surface orthogonal to the first mounting surface, each of the first and second mounting surfaces having at least one aperture formed therein to receive a magnetic coupling element.

BRIEF DESCRIPTION OF THE DRAWINGS

The present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. All of the embodiments described in this Detailed Description are exemplary embodiments provided to enable persons skilled in the art to make or use the embodiment and not to limit the scope that is defined by the claims. Furthermore, there is no intention to be bound by any expressed or implied theory presented in the preceding Technical Field, Background, Drawings Summary or the following Detailed Description.

A leveling device for use in elevating (or jacking) a vehicle is described herein. While the leveling device of the present disclosure is described as affording an advantage in an aircraft maintenance applications, it will be appreciated that the present disclosure may be advantageously employed in other applications, including but not limited to, service operations for ground based vehicles, watercraft and spacecraft without departing from the teachings of the present disclosure. Furthermore, use of the leveling device of the present disclosure is not limited to use in servicing vehicles, but rather may be employed in any process that entails leveling an object.

A greater understanding of the leveling device described above may be obtained through a review of the illustrations accompanying this application together with a review of the Detailed Description that follows.

Figure 1:
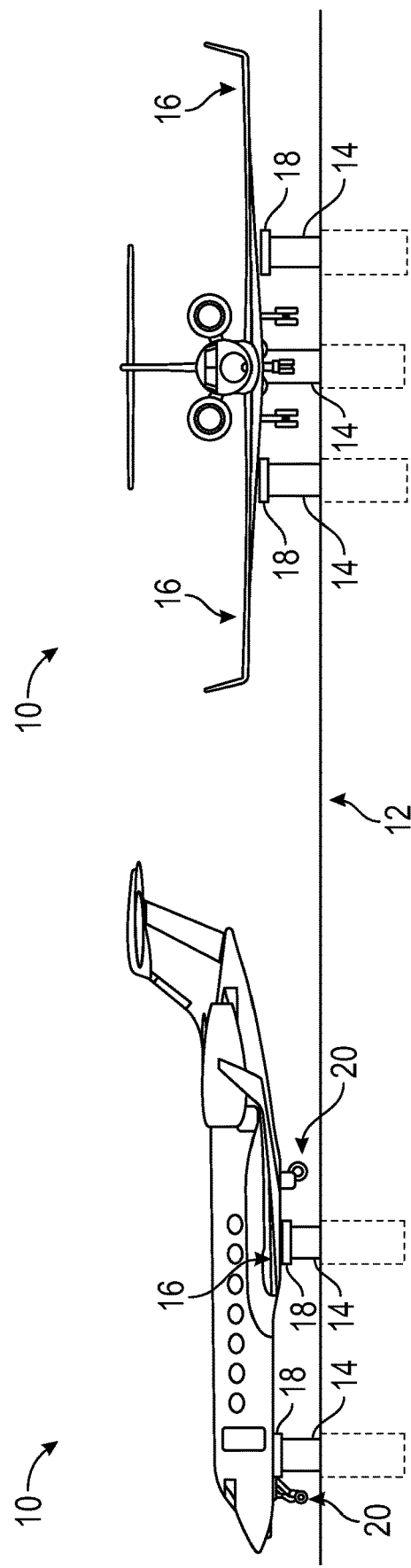
FIGS. 1A and 1B are illustrations of an aircraft elevated for a maintenance operation in accordance with the teachings of the present disclosure.

FIGS. 1A and 1B illustrate an aircraft 10 elevated above a service center floor 12 via hydraulic jacks 14. As is known, hydraulic jacks 14 are usually built into the floor 12 of the service center as illustrated by the dashed lines in FIGS. 1A and 1B. As is shown, each of the hydraulic jacks 14 interface with a jack pad 18, that is coupled by service technicians to the wings 16 and the fuselage of the aircraft just aft of the front landing gear prior to the elevation (jacking) operation to service the aircraft, such as, the landing gear 20. Typically, each of the hydraulic jacks 14 is operated (i.e., raised or lowered) independently by service technicians who must maintain the aircraft in a substantially level position so that the aircraft 10 does not slide off the hydraulic jacks 14.

Figure 2:
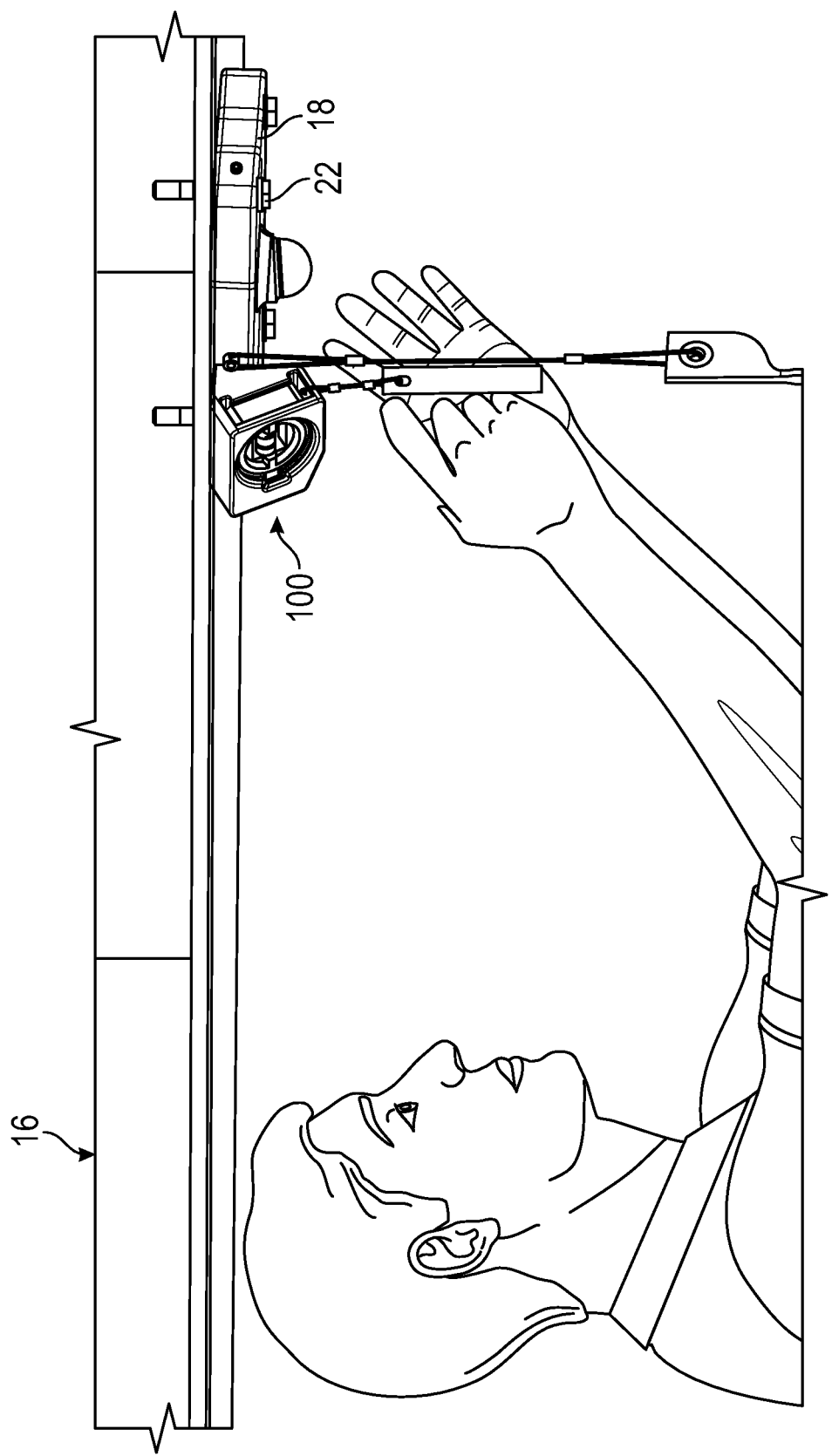
FIG. 2 is an illustration of a leveling device coupled to a jack pad in accordance with the teachings of the present disclosure.

Referring now to FIG. 2, a non-limiting embodiment of a leveling device 100 is illustrated coupled to the jack pad 18, which has been fixed to the wing 16 of the aircraft via removable fasteners 22. As will be explained in more detail below, the leveling device 100 of the present disclosure includes a rear mounting support that positions the front surface of the leveling device at approximately a thirty-degree angle relative to the jack pad 18 for easy viewing by the service technician. As will be appreciated, other viewing angles may be provided for any particular embodiment as desired.

Figure 3A:
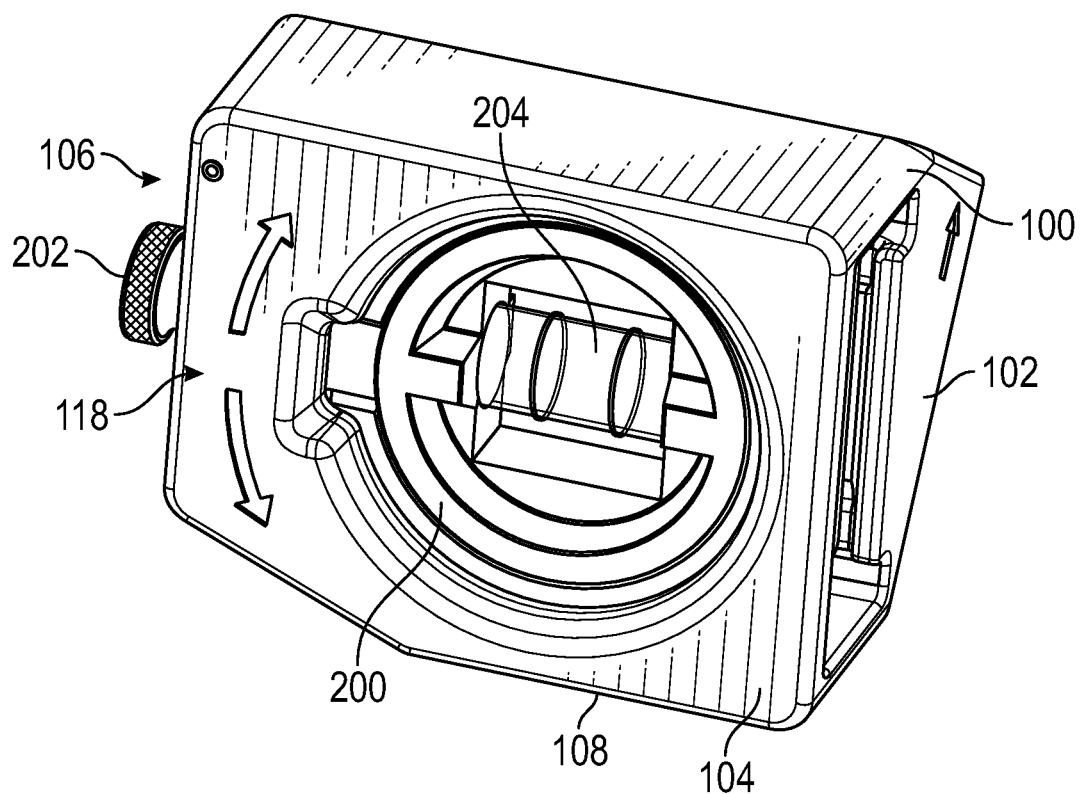
FIGS. 3A and 3B are perspective views of the leveling device of FIG. 2 in accordance with the teachings of the present disclosure.
Figure 3B:
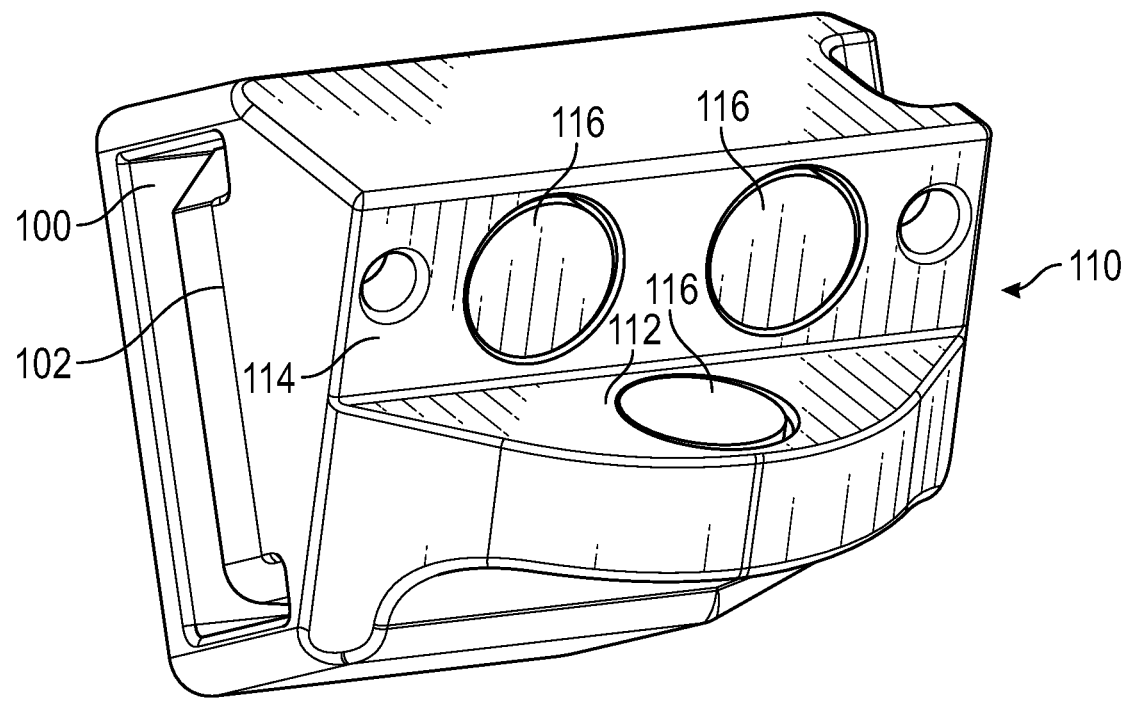
Figure 5A:
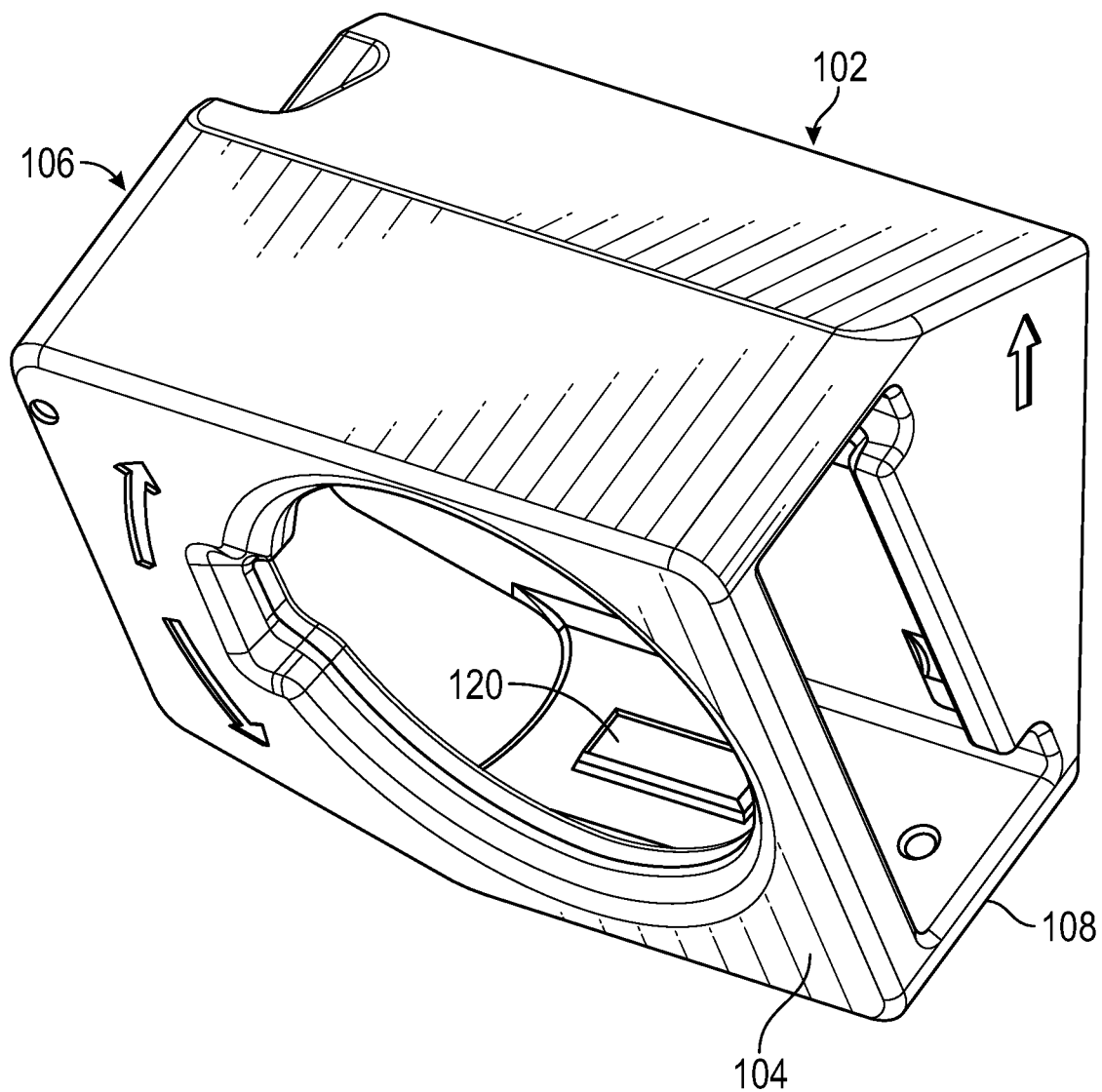
FIGS. 5 A-E are line drawings illustrating the body of the leveling device in accordance with the teachings of the present disclosure.
Figure 5B:
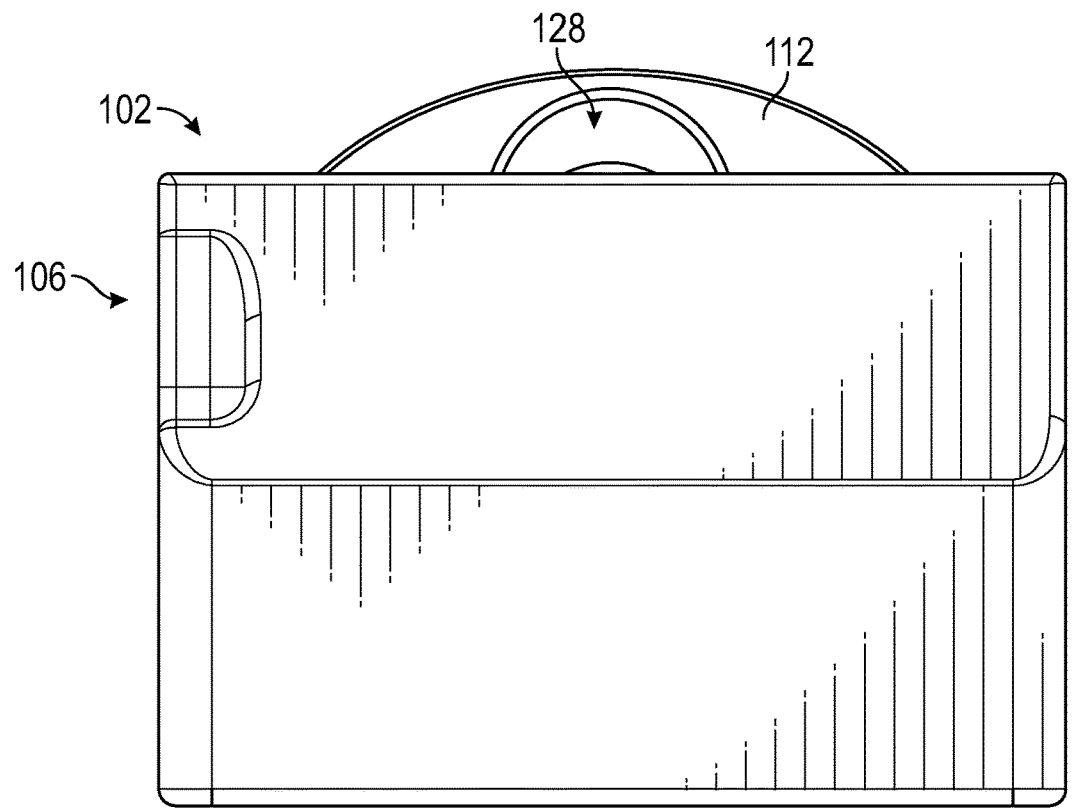
Figure 5C:
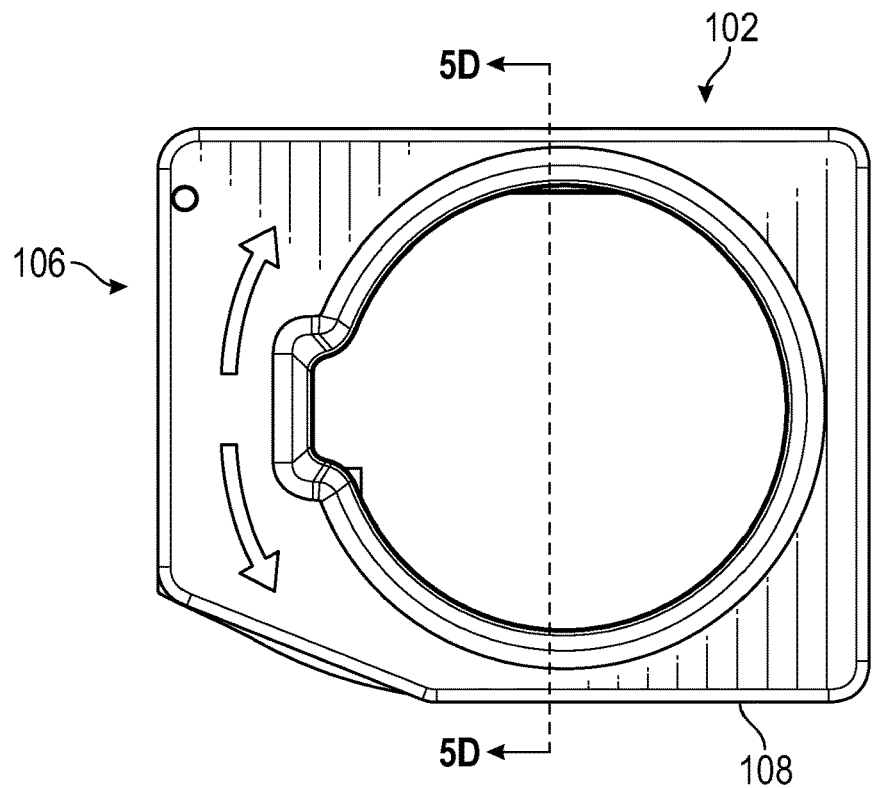
Figure 5D:
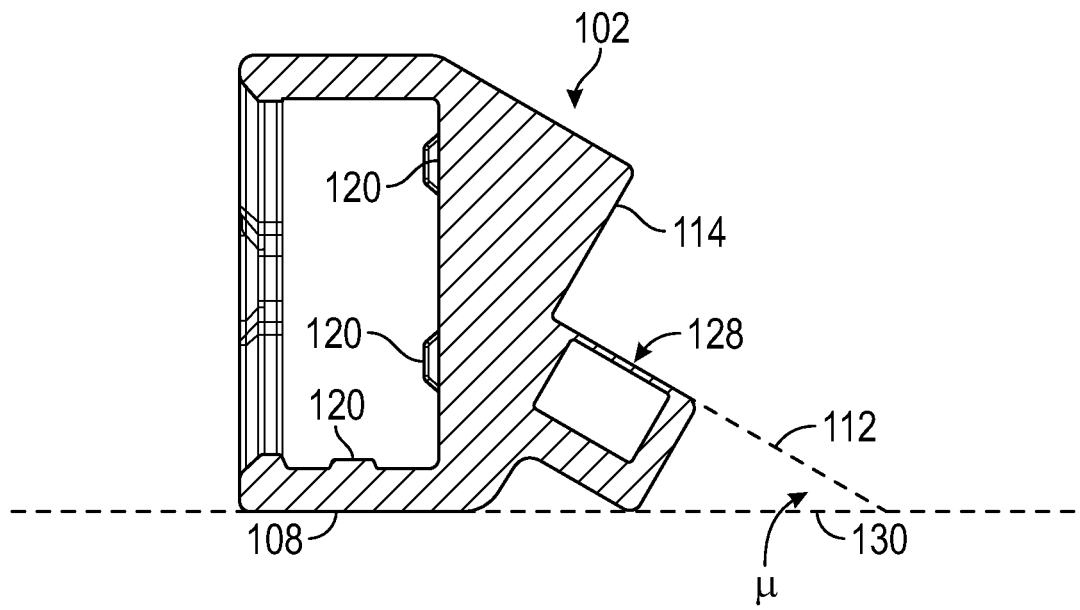
Figure 5E:
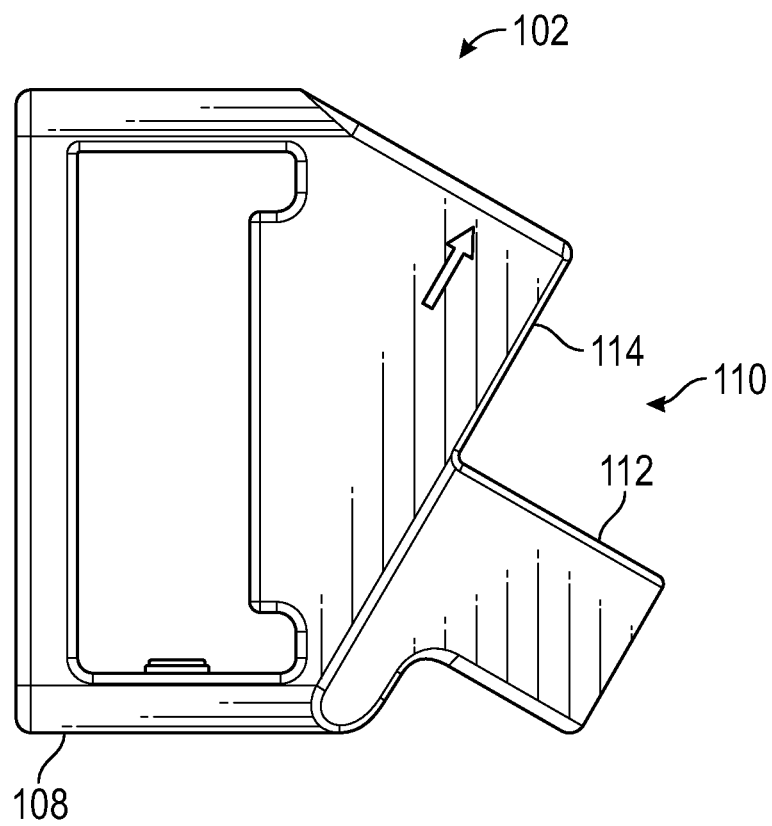

Referring now to FIGS. 3A and 3B, perspective front and rear views of a non-limiting embodiment of the leveling device 100 are shown. The leveling device 100 includes a body 102 having a front surface 104, a side surface 106, a bottom surface 108 and a rear mounting support 110. In some embodiments, the body 102 is made of a thermoplastic material that is produced by 3-D printing using fused deposition modeling (FDM) as is know in the art. In other embodiments, the body 102 may be formed by conventional injection molding techniques. The rear mounting support 110 includes a first mounting surface 112 that is configured to be an angle relative to the bottom surface 108 (best seen in FIG. 5D) and a second mounting surface 114 that is substantially orthogonal to the first mounting surface. Each of the first mounting surface and second mounting surface include apertures (128 in FIG. 5B and FIG. 5D) formed therein to receive magnetic coupling elements 116. The magnetic mounting elements 116 permit the leveling device 100 to be magnetically coupled to the jack pad 18 and then easily removed after servicing the aircraft 10 (see FIG. 2). In some non-limiting embodiments, the magnetic coupling elements comprise rare earth magnets, such as, for example, neodymium magnets. As will be appreciated, magnets are available with a variety of magnetic attractive force, and in some embodiments, a magnetic attraction force of twenty pounds is preferred for each magnetic coupling element 116.

In non-limiting embodiments, the side surface 106 of the body 102 includes an aperture for receiving a spirit level 200. As used herein, a "spirit level" or "bubble level" means an instrument designed to indicate whether a surface is horizontal (level) or vertical (plumb). In fundamental embodiments, the spirit level 200 comprises a tubular bubble level, such as, for example, model 48-22-5102 pocket level available from MILWAUKEE TOOL. Operationally, after magnetically coupling the leveling device 100 to the jack pad 18 (see FIG. 2), a releasable fastener 202 is loosened to allow the tubular bubble element 204 to rotate (as indicated by the reference arrows 118 on the body 102) within the spirit level 200 to calibrate (commonly referred to as "zero" or "level") the tubular bubble element 204 after, which the releasable fastener 202 is tightened. Then, as the aircraft 10 is elevated by the service technicians, an objective determination of whether the aircraft wings 16 remain level during the jacking operation can be easily made.

Figure 4:
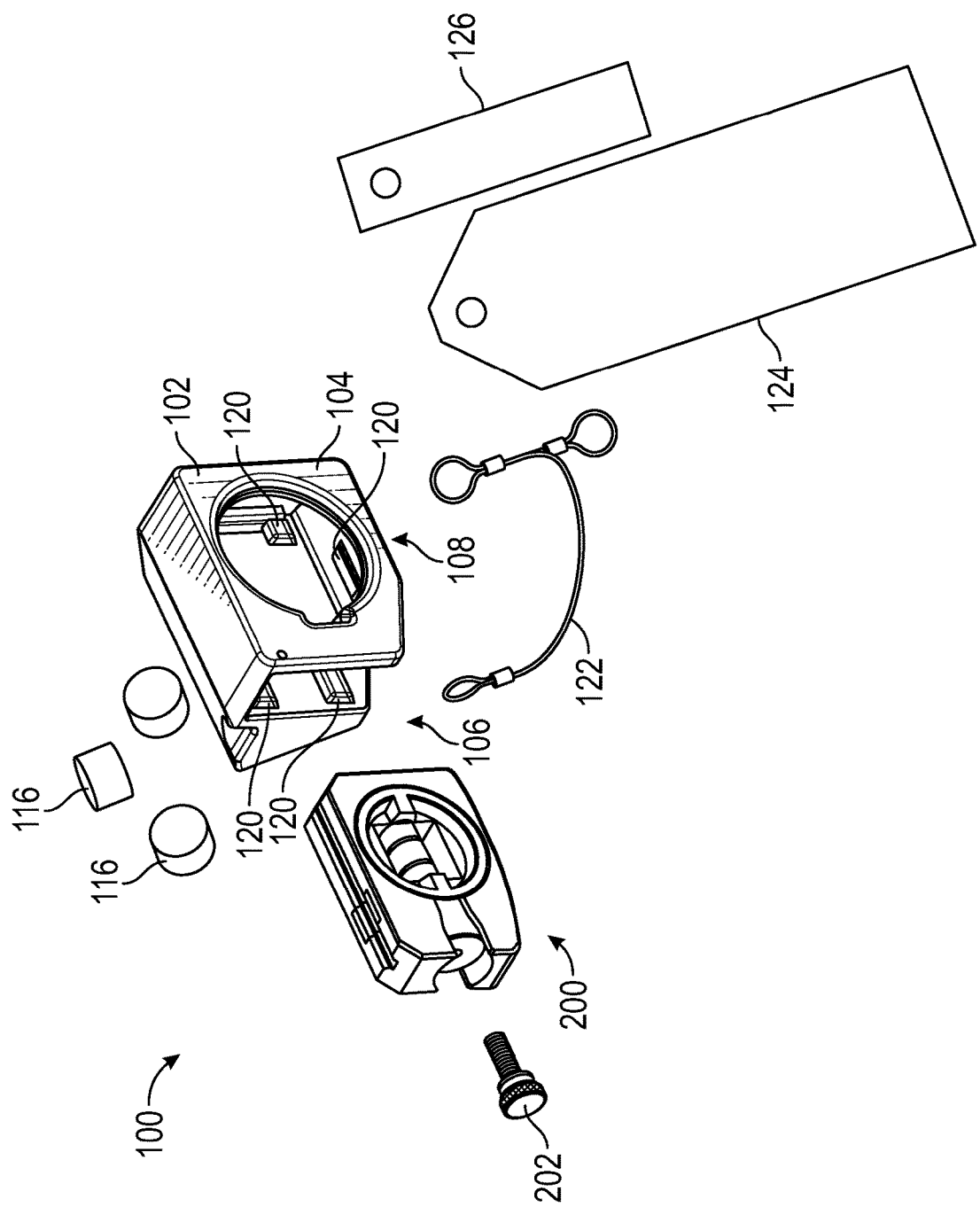
FIG. 4 is an exploded perspective view of the leveling device in accordance with the teachings of the present disclosure.

With continued reference to FIGS. 3A and 3B, FIG. 4 is an exploded view of the leveling device 100 to further illustrate an exemplary embodiment. In FIG. 4, it can be seen that the side surface 106 of the body 102 includes an aperture for receiving the spirit level 200. In some embodiments, the body 102 includes protrusions 120 to facilitate a friction fit of the spirit level 200 within the body 102. In other embodiments, the spirit level 200 may be fixed within the body 102 by an adhesive (e.g., epoxy) to secure the spirit level in the body 102. In some embodiments, the leveling device 100 includes a lanyard 122 that couples to the body 102. The lanyard may be used to couple tools or labels to the leveling device 100, such as, for example, a magnetic field caution label 124 to advise service technicians that may have an implantable pacemaker, defibrillator or other medical device that caution should be taken when coming near to the leveling device 100. As another example, a "remove before flight" label 126 may be attached to the leveling device 100 by the lanyard 122 to remind service technicians to remove the leveling device at the conclusion of the service operation. Other labels are, of course, possible as desire for any particular realization of the illustrated exemplary embodiment.

FIGS. 5 A-E are line drawings (some with exemplary dimensions) of the body 102 in accordance non-limiting embodiments of the present disclosure. FIG. 5 A is a perspective top-front view while FIG. 5B is a top view. As noted above, the rear mounting support 110 includes apertures 128 formed in the first mounting surface 112 and second mounting surface 114 as can be best seen in FIG. 5 B and FIG. 5D. These apertures 128 receive the magnetic coupling elements 116, which may be held in place by an adhesive (e.g., epoxy). FIG. 5C is a front view illustrating section line A-A which is shown in FIG. 5D. As noted above and illustrated in FIG. 5D, the first mounting surface 112 is configured to be at an angle ($\mu$) relative to a plane 130 of the bottom surface 108. In some embodiments, the angle ($\mu$) is approximately thirty-degrees, however, other angles are possible as will be appreciated depending upon the embodiment being realized. It is the angle ($\mu$) that enables the leveling device 100 to present the front surface 104 (and thus the technician's view of the spirit level 200) at an approximate thirty-degree angle for ease of viewing (see FIG. 2). The second mounting surface 114 is configured to be orthogonal to the first mounting surface 112 (as can be seen in FIG. 5D and FIG. 5E) allowing for a square corner of the rear mounting support 110 to securely magnetically couple to the jack pad 18.

Figure 6:
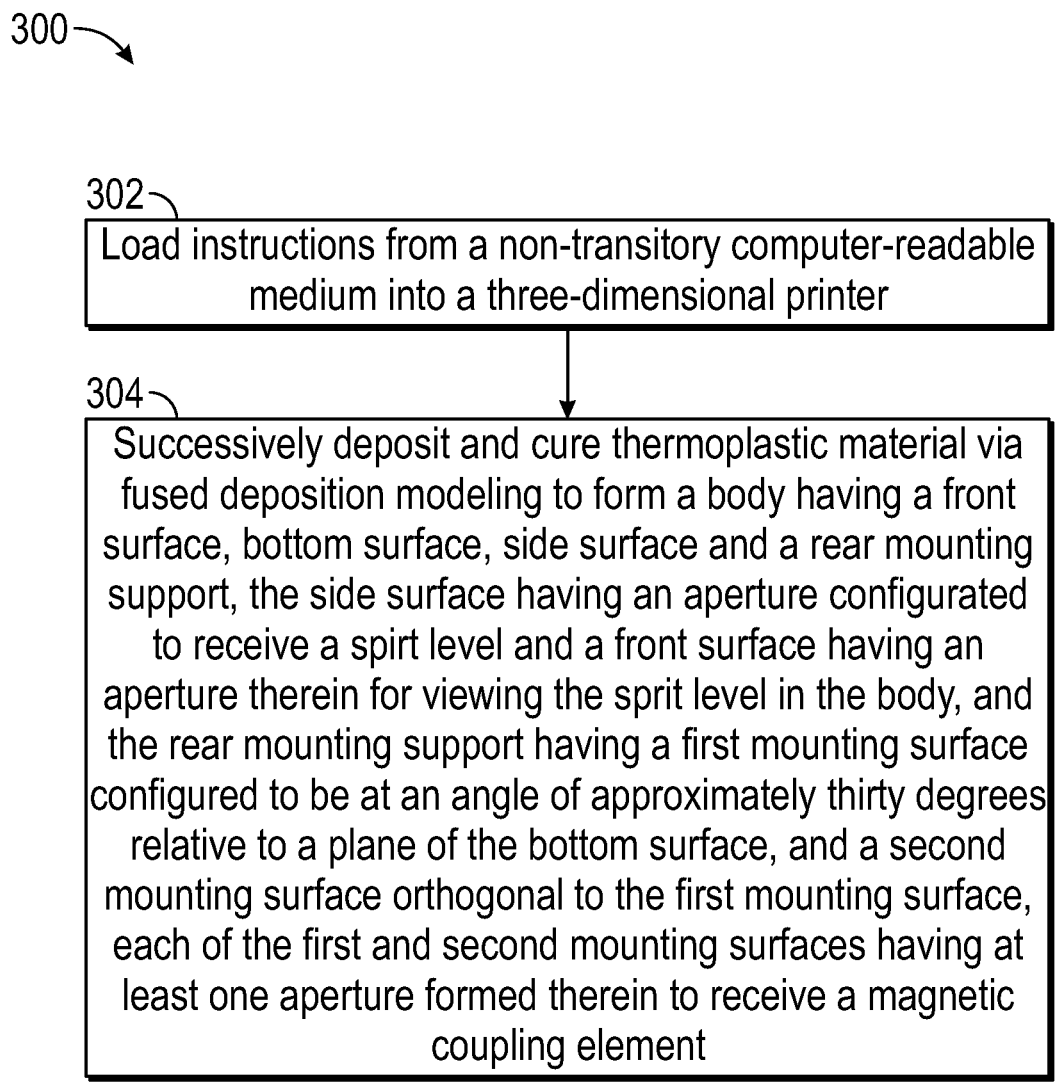
FIG. 6 is a is a flow diagram illustrating a method in accordance with the teachings of the present disclosure.

As mentioned above, the present disclosure contemplates that the leveling device body 102 may be formed by three-dimensional printing. Accordingly, the present disclosure contemplates a non-transitory computer-readable medium that would contain instructions that when executed by a processor of a three-dimensional printer would cause the printer to successively deposit material in a way to form the body 102 of the leveling device 100 in any particular shape or size desired for any particular application. As a non-limiting example, FIG. 6 illustrates one embodiment of a method 300 of the present disclosure, where the non-transitory computer-readable medium would contain instructions that when loaded (block 302) and executed by a processor (block 304) would cause fused deposition modeling (FDM) to create the body having a front surface, bottom surface, side surface and a rear mounting support, the side surface having an aperture configured to receive a spirt level and a front surface having an aperture therein for viewing the sprit level in the body, and the rear mounting support having a first mounting surface configured to be at an angle of approximately thirty degrees relative to a plane of the bottom surface, and a second mounting surface orthogonal to the first mounting surface, each of the first and second mounting surfaces having at least one aperture formed therein to receive a magnetic coupling element.

It will be appreciated that skilled artisans may form the leveling device in varying ways for each particular application, but such implementation variations should not be interpreted as causing a departure from the scope as set forth in the claims.

In this document, relational terms such as first and second, and the like may be used solely to distinguish one entity or action from another entity or action without necessarily requiring or implying any actual such relationship or order between such entities or actions. Numerical ordinals such as first, second, third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as connect or coupled to that are used in describing a relationship between different elements does not imply that a direct physical connection must be made between these elements. For example, two elements may be connected to each other physically, electronically, logically, or in any other manner, through one or more additional elements.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A leveling device, comprising:
   a body having front surface, bottom surface, side surface and a rear mounting support;
   the side surface having an aperture configured to receive a spirt level and a front surface having an aperture therein for viewing the sprit level in the body;
   the rear mounting support having a first mounting surface configured to be at an angle relative to a plane of the bottom surface, and a second mounting surface orthogonal to the first mounting surface, each of the first and second mounting surfaces having at least one aperture formed therein to receive a magnetic coupling element;
   whereby, the body containing the sprit level may be magnetically coupled to a vehicle to indicate whether the vehicle remains level during a jacking operation.

2. The leveling device of claim 1, wherein the body is formed by fused deposition modeling of a thermoplastic material.

3. The leveling device of claim 1, wherein the spirit level comprises a model 48-22-5102 level produced by MILWALKEE TOOL.

4. The leveling device of claim 3, wherein the spirit level includes a releasable fastener for calibrating the spirit level in the body.

5. The leveling device of claim 1, wherein the angle of the first mounting surface is approximately thirty degrees.

6. The leveling device of claim 5, wherein the magnetic coupling elements comprise rare earth magnets.

7. The leveling device of claim 6, wherein each of the rare earth magnets comprise neodymium magnets.

8. The leveling device of claim 7, wherein each of the neodymium magnets have a magnetic attraction force of approximately twenty pounds.

9. The leveling device of claim 1, wherein the body includes protrusions formed within the aperture of the side surface to retain the spirit level.

10. The leveling device of claim 9, wherein the spirit level is further retained in the body by an adhesive.

11. The leveling device of claim 1, further comprising a lanyard attached to the body.

12. The leveling device of claim 11, further comprising a magnetic field caution label coupled to the lanyard.

13. The leveling device of claim 11, further comprising a 'remove before flight' label coupled to the lanyard.

14. A leveling device, comprising:
    a body having front surface, bottom surface, side surface and a rear mounting support;
    the side surface having an aperture configured to receive a spirt level and a front surface having an aperture therein for viewing the sprit level in the body;
    the rear mounting support having a first mounting surface configured to be at an angle of approximately thirty degrees relative to a plane of the bottom surface, and a second mounting surface orthogonal to the first mounting surface, each of the first and second mounting surfaces having at least one aperture formed therein to receive a neodymium magnetic coupling element;
    whereby, the body containing the sprit level may be magnetically coupled to a vehicle to indicate whether the vehicle remains level during a jacking operation.

15. The leveling device of claim 14, wherein the spirit level comprises a model 48-22-5102 level produced by MILWALKEE TOOL.

16. The leveling device of claim 14, wherein the spirit level is further retained in the body by an adhesive.

17. The leveling device of claim 14, further comprising a lanyard attached to the body.

18. The leveling device of claim 17, further comprising a magnetic field caution label coupled to the lanyard.

19. The leveling device of claim 17, further comprising a 'remove before flight' label coupled to the lanyard.

20. A non-transitory computer-readable medium for producing a body for a leveling device, the non-transitory computer-readable medium comprising instructions stored thereon, that when executed by a processor, cause a three-dimensional fused deposition modeling printer to perform the steps of:
  successively deposit a thermoplastic material to produce the body having:
    a front surface, bottom surface, side surface and a rear mounting support, the side surface having an aperture configured to receive a spirt level and a front surface having an aperture therein for viewing the sprit level in the body, and the rear mounting support having a first mounting surface configured to be at an angle of approximately thirty degrees relative to a plane of the bottom surface, and a second mounting surface orthogonal to the first mounting surface, each of the first and second mounting surfaces having at least one aperture formed therein to receive a magnetic coupling element.

* * * * *